J. P. BERG AND J. M. GLEASON.
BODY FOR DUMPING TRUCKS.
APPLICATION FILED JUNE 21, 1920.

1,395,028.

Patented Oct. 25, 1921.
3 SHEETS—SHEET 1.

Witness
R. J. Horomichl.

Inventor
JOHN P. BERG,
JAMES M. GLEASON.
By Millard Eddy, Attorney

J. P. BERG AND J. M. GLEASON.
BODY FOR DUMPING TRUCKS.
APPLICATION FILED JUNE 21, 1920.

1,395,028.

Patented Oct. 25, 1921.
3 SHEETS—SHEET 2.

Witness
R. J. Honomichl

Inventor
JOHN P. BERG,
JAMES M. GLEASON.
By Millard Eddy
Attorney

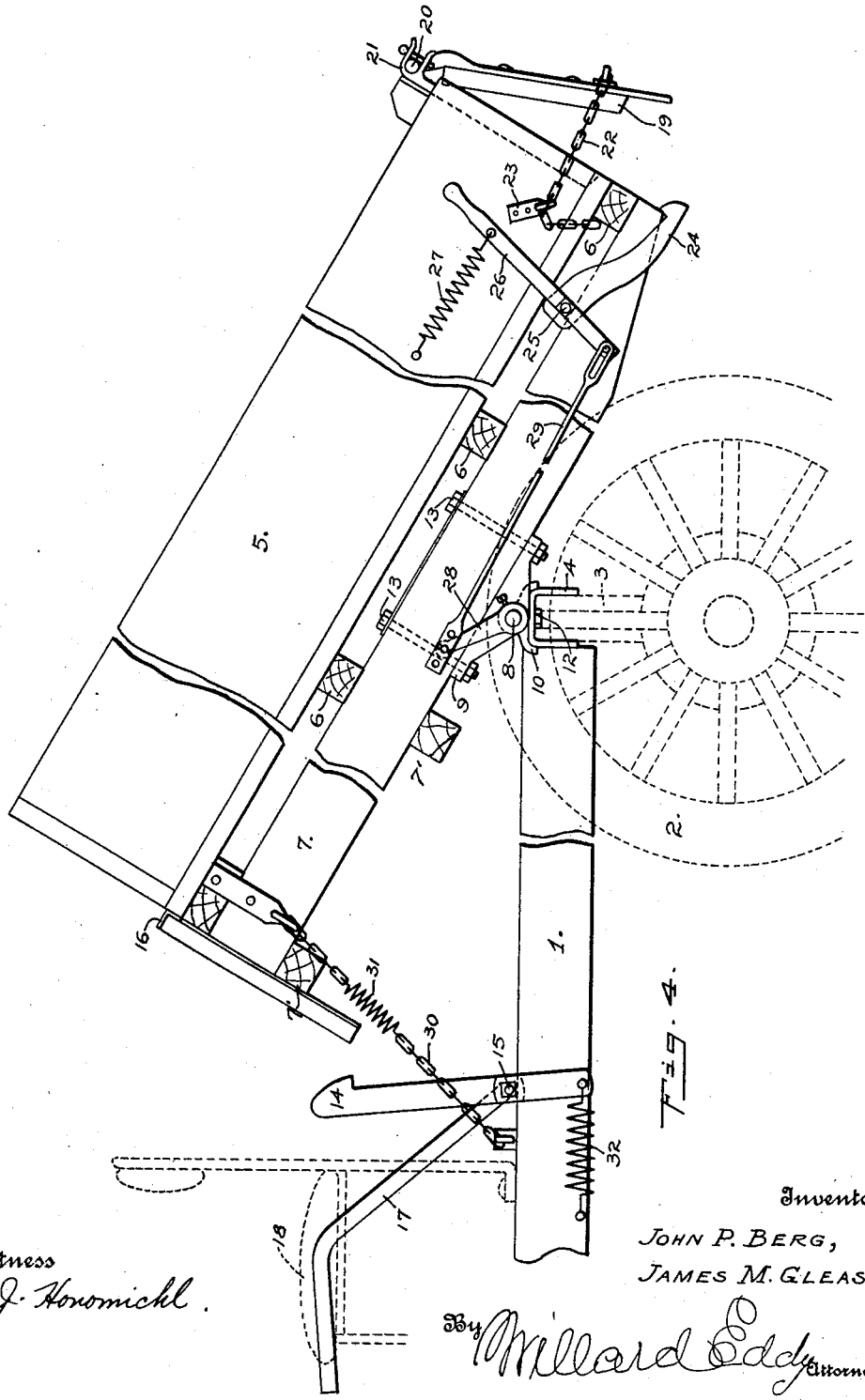

UNITED STATES PATENT OFFICE.

JOHN P. BERG AND JAMES M. GLEASON, OF OMAHA, NEBRASKA; SAID GLEASON ASSIGNOR OF ALL HIS RIGHT TO GREAT WESTERN COMMERCIAL BODY COMPANY, OF OMAHA, NEBRASKA, A CORPORATION OF NEBRASKA.

BODY FOR DUMPING-TRUCKS.

1,395,028.  Specification of Letters Patent.  Patented Oct. 25, 1921.

Application filed June 21, 1920. Serial No. 390,323.

*To all whom it may concern:*

Be it known that we, JOHN P. BERG and JAMES M. GLEASON, citizens of the United States, residing in the city of Omaha, in the county of Douglas and State of Nebraska, have invented certain new and useful Improvements in Bodies for Dumping-Trucks, and have described the same in the following specification, illustrated by the accompanying drawings.

Our invention relates to that class of trucks which are commonly used for transporting and dumping successive loads of sand, grain, coal, broken stone or ore, mixed ingredients for concrete construction, or other aggregated portions of material, and which individually comprise a self-propelled vehicle and a tiltable truck body mounted thereon. It is the main object of the invention to utilize as part of a dumping truck of this class an existing and well known type of chassis; to dispense with all use of motors, pumps and other mechanism for hoisting or tilting the truck body; thereby to economize available space on the chassis; to render such a truck both self-dumping and easily righted, at the will of the driver; to enable the driver to control the operation of the tiltable truck body without dismounting, and without leaving his seat on the truck; to adapt the truck to operate, when desired, as a spreader dumping its load on the ground distributively in a regulated manner while in motion; at the same time to render the apparatus quick in action, easy and convenient in operation, and inapt to get out of order; and in general to simplify the construction of the truck, and reduce its weight, the number of its wearing parts and the cost of manufacture. To accomplish these objects we incorporate in our improved truck, as parts thereof, a chassis which is of the type of the Ford light truck chassis, socalled, a tiltable box-like body which is pivotally mounted on the rear spring of the chassis, an adjustable endgate of the pivoted body, and a self-acting catch for the endgate.

Figure 1:
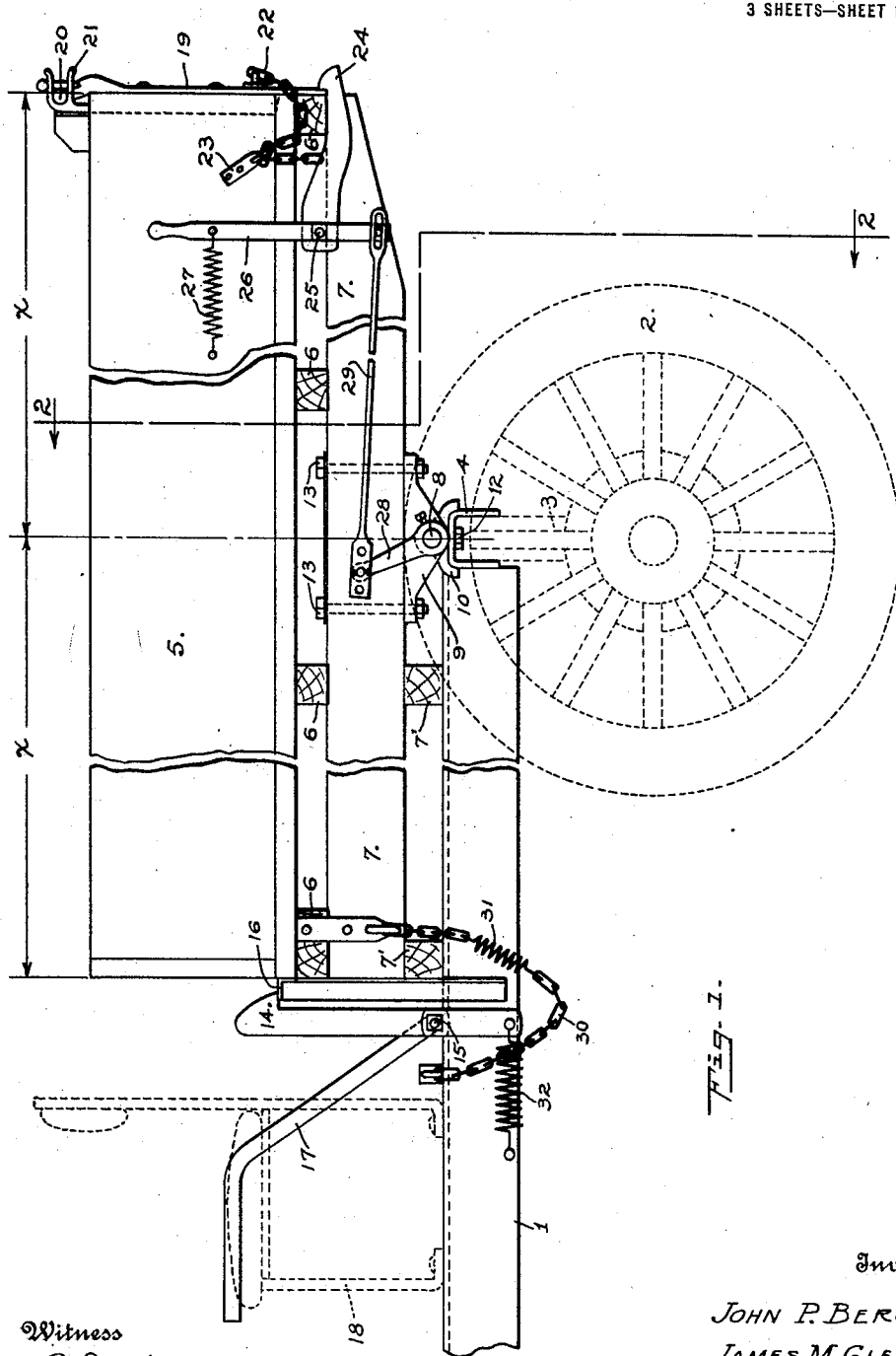
Figure 2:
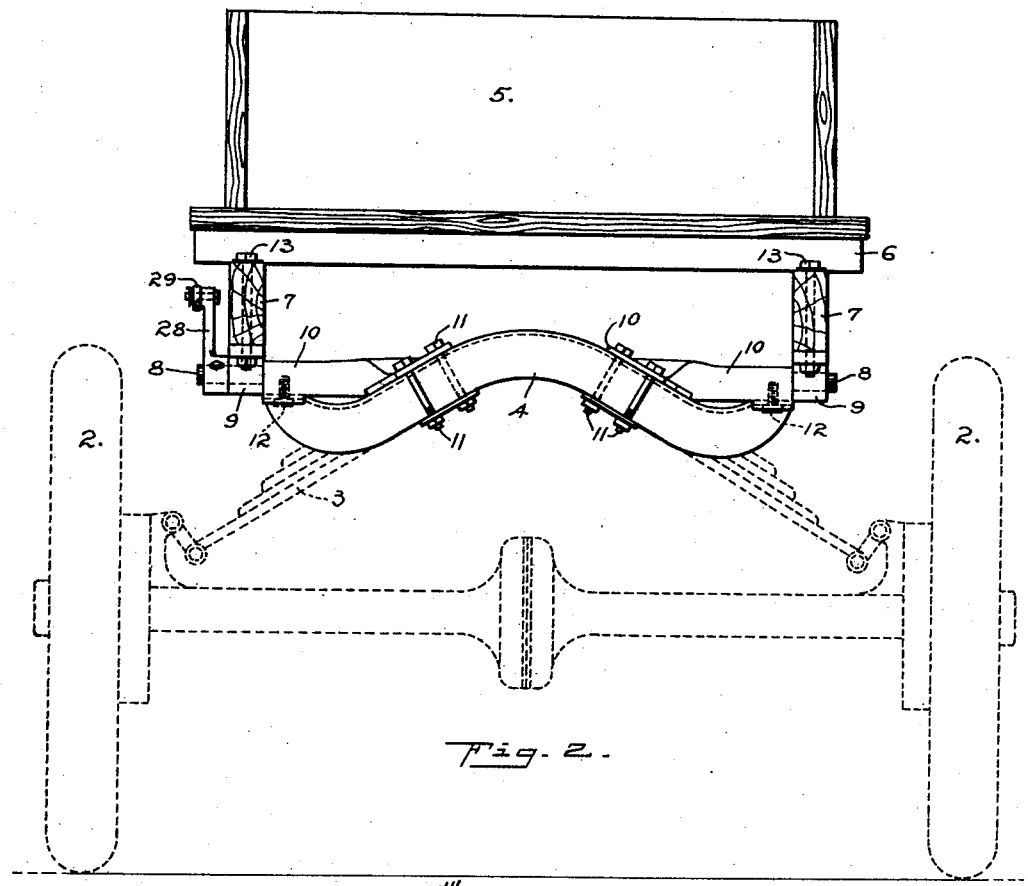
Figure 3:
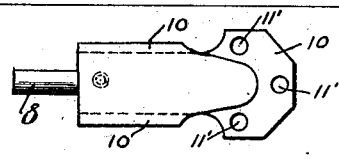

In said drawings, illustrating the best manner in which we have contemplated applying the principles of the invention, Figure 1 is an incomplete side elevation of a dumping truck whose body is constructed in accordance with these principles. Fig. 2 is a transverse section on the section line 2—2 of Fig. 1. Fig 3 is a detail. Fig. 4 is an incomplete side elevation of the same truck positioned as in dumping.

The chassis indicated in these drawings is of the common type found in the Ford light truck, or one-ton truck, socalled, and comprises the chassis frame 1, the rear wheels 2, the laminated leaf spring 3, which is mounted on the rear axle, and the rear cross member 4, which is secured to the spring, all constructed and arranged as in that well-known truck. The tiltable body of the truck comprises the rectangular box or receptacle 5, the horizontal cross-bars 6 under the box, the normally horizontal side sills 7 under the bars, and the cross-beams 7' under these sills, all rigidly joined together. It is tiltably mounted on the chassis by means of the duplicate pivotal brackets 10 and the bearing-blocks 9. These brackets, one of which is shown in plan in Fig. 3, are secured on the rear cross member 4 by the screws 12 and the bolts 11 in the bolt-holes 11', and are provided respectively with the opposite terminal shafts 8, disposed in mutual alinement transversely of the chassis; while the bearing-blocks 9, secured respectively to the sills 7 by the bolts 13, are adapted to oscillate rotarily on these shafts as a pivot. On this pivot the truck body, with its load, is approximately balanced, or is by preference slightly overbalanced forward. When horizontal it rests partly on its cross-beams 7'.

To hold the truck body in its normal position for loading and travel, as shown in Fig. 1, the latch 14, actuated by the spring 32, is mounted on the chassis frame by the pivot-pin 15. It is adapted automatically to engage the catch 14 affixed to the front of the truck body and is provided with a lever handle 17 within reach of the driver on the seat 18. To effect the opening and closing of the truck body at its rear end and regulate the dumping discharge therefrom, the hanging gate, or tailboard 19, is removably suspended across the opening by the transversely alined pivots 20 which are journaled in the brackets 21 affixed to the opposite side walls of the body. To limit the opening of this gate according to the desired rate of discharge from the truck as a spreader, the attached stop chain 22 is changeably hitched manually at any desired length to the hook 23 on the side of the box. To hold the gate shut, as during loading or travel, the catch 24, pivotally mounted on one of the sills 7 by the pivot-pin 25, is adapted automatically to engage the gate when closed. This catch has the lever handle 26, which is impelled to effect the latching of the gate, when closed, by the tension of the spring 27 on the side of the box. To unlatch the endgate by the tilting of the body in dumping, this hand lever is connected with the chassis bracket 10 by the adjustable radial arm 28 on the shaft 8 and the coupling rod 29 which links this arm to the lever. This rod is of adjustable length and has a slot and pin engagement with the lever. To prevent the truck body from tilting back too far in the act of dumping, and to stop it softly when tilted far enough, the front end of the body is tied to the frame of the chassis by a yielding connection comprising the chain 30 and tension spring 31, which are continuously of proper length for that purpose.

To unload the truck body, the driver operatively releases the catch 16 from the latch 14 by pressing down the latch handle 17, and thus permits the tilting of the body to the position shown in Fig. 2. This tilting movement, may be initiated by hand, whenever not promptly automatic, and will cause the latch 24, actuated through the coupling-rod 29, to release the pivoted endgate. The latter then swings either wide open or partly open, as the preadjusted operative length of the stop chain 22 may allow.

The load then by its own weight discharges itself from the tilted body, at such rate as the opening of the gate may allow, whether the truck is standing still or is in motion for the purpose of spreading its contents on the ground.

We claim as our invention—

1. In a self-propelled dumping truck having a rear cross member secured on the rear spring of the truck, a tiltable box having a pivoted endgate; a catch provided with a hand-lever and pivoted to the box to engage the endgate; a pair of alined shafts carried by the cross member and journaled in bearings affixed to the box; a radial arm adjustable rotarily on one of the transverse shafts; and a coupling rod connecting the radial arm with the hand lever.

2. In a dumping truck having a cross member mounted on the rear spring of the truck, a tiltable box having a hinged endgate; a spring-actuated catch provided with a handlever and pivoted to the side of the box within reach of the endgate when closed; a pair of alined shafts secured to the cross member and journaled transversely of the box in bearings affixed thereto; a radial arm adjustable rotarily on one of the shafts; and a coupling rod pivoted to the radial arm and having a slot-and-pin connection with the hand-lever.

Witness our signatures at Omaha, Nebraska, May 24, 1920.

JOHN P. BERG.
JAMES M. GLEASON.